United States Patent
Schock

(10) Patent No.: US 6,173,631 B1
(45) Date of Patent: Jan. 16, 2001

(54) SAW GUIDE

(76) Inventor: Stanton Jay Schock, 5424 Berryhill Dr., Yorba Linda, CA (US) 92886

( * ) Notice: Under 35 U.S.C. 154(b), the term of this patent shall be extended for 0 days.

(21) Appl. No.: 09/118,313

(22) Filed: Jul. 16, 1998

(51) Int. Cl.[7] .................................................. B26D 1/00
(52) U.S. Cl. ................................. 83/13; 83/594; 83/745
(58) Field of Search ............................. 83/13, 169, 594, 83/821, 745, 479, 522.17, 486.1, 581, 471.2, 642

(56) References Cited

U.S. PATENT DOCUMENTS

| | | | | |
|---|---|---|---|---|
| D. 282,626 | | 2/1986 | Zelli .................................. | D8/71 |
| D. 303,752 | | 10/1989 | Gleeson ............................. | D8/71 |
| 3,830,130 | * | 8/1974 | Moore ............................... | 83/745 |
| 3,910,146 | * | 10/1975 | Earl .................................. | 83/745 |
| 4,023,273 | * | 5/1977 | Treleaven ......................... | 30/373 |
| 4,202,233 | * | 5/1980 | Larson .............................. | 83/745 |
| 4,244,118 | | 1/1981 | Matuszak ......................... | 33/430 |
| 4,325,278 | | 4/1982 | Beerens ............................ | 83/745 |
| 4,356,748 | | 11/1982 | Tilton ................................ | 83/745 |
| 4,494,434 | | 1/1985 | Young ............................... | 83/745 |
| 4,522,098 | | 6/1985 | Bliss ................................. | 83/745 |
| 4,624,054 | * | 11/1986 | Edwards ........................... | 30/374 |
| 4,790,072 | * | 12/1988 | Edwards ........................... | 30/376 |
| 4,867,425 | | 9/1989 | Miraglia ........................... | 269/1 |
| 5,206,999 | | 5/1993 | Stone ................................ | 30/372 |
| 5,603,164 | * | 2/1997 | Haddix ............................. | 33/456 |
| 5,983,767 | * | 11/1999 | Defelice et al. ................. | 83/745 |

* cited by examiner

*Primary Examiner*—Lee Young
*Assistant Examiner*—Minh Trinh
(74) *Attorney, Agent, or Firm*—Eric Karich

(57) ABSTRACT

A method for precisely cutting a workpiece using a saw guide to guide a hand held power saw, the saw guide having a first upper sliding surface and an opposing flat lower surface connected by a first side surface, the first upper sliding surface being bounded on one side by an integral guide ridge, and bounded on the opposing side by a first side surface, provides for first customizing the saw guide to a power saw having a base plate with a side edge. The saw guide is customized by positioning the power saw with the base plate resting upon the first upper sliding surface and the side edge contacting the integral guide ridge, and sliding the power saw along the saw guide, thereby cutting off the first side surface and creating a side cutting surface having a lower cut indicating edge. Once customized, the saw guide can be used with the power saw to cut the workpiece, with the lower cut indicating edge indicating to the user precisely where the power saw will cut the workpiece.

1 Claim, 4 Drawing Sheets

SAW GUIDE

BACKGROUND OF THE INVENTION

1. Field of the Invention

This invention relates generally to carpentry tools, and more particularly to a saw guide for assuring a straight cut with a hand held power saw.

2. Description of Related Art

The following art defines the present state of this field:

Stone, U.S. Pat. No. 5,206,999, discloses a combination saw guide and surface protector which can conveniently be used with a hand operated, power circular saw. The apparatus includes a surface protector which prevents the soleplate of the saw from engaging and possibly damaging the surface of the workpiece. The apparatus includes two or more sections that can be quickly and easily connected together to enable precision cuts to be made even on very large sheets of paneling.

Miraglia, Jr., U.S. Pat. No. 4,867,425, discloses a one-piece elongated rectangular metal fence plate adjustably attachable to a cutable guide base of plywood or plastic. One longitudinal edge of the fence plate is formed into a guide fence for hand held power circular saws or saber saws. For the initial setup, the fence plate must be bolted to the guide base. The guide base is then cut to size using a power hand saw with the guide fence of the attached fence plate serving as the saw guide to assure parallel alignment of the guide fence relative to the cut edge of the guide base. Tilton, U.S. Pat. No. 4,356,748, discloses a an adjustable saw guide for hand held power saws. The guide is adjustable by an adjustment and locking of an elongate saw guide member in the proper position on the surface of a saw table slide member that serves as a base of the apparatus.

Matuszak, U.S. Pat. No. 4,244,118, discloses an alignment device for guiding a hand manipulated power tool on the surface of a planar workpiece. The device includes an elongate guide member having a guide surface for guiding the show of the power tool and elongate gauge member having alignment edge adapted to be aligned on and with a desired line of cut on the surface of the workpiece. The elongate gauge member is releasably fixed to the guide member. The guide surface is parallel spaced to the alignment edge a predetermined distance equal to the distance from the shoe of the power tool to the path of travel of the cutting member of the power tool. The device also includes clamps for holding the alignment device to the workpiece and mating coupling members at each end of the device so that two or more devices can be coupled together to provide a composite longer alignment device.

Beerens, U.S. Pat. No. 4,325,278, discloses a hand saw guide having a member having two right angled related surfaces so that where one surface is in face to face contact with a component to be sawn to the other surface is perpendicular to the component. The other surface having incorporated therein a magnet that creates a magnetic field to hold the blade of a saw against said other surface. The saw can thus be operated to cut the component while held in guided relationship with the other surface.

Bliss, U.S. Pat. No. 4,522,098, discloses a guide to be clamped on a door or similar object to guide a portable circular saw to insure accurate cuts. The guide has an elongated, rigid member having a block pivotally attached at one end. The object to be cut with the saw is clamped between that block and a second pivoting block slidable secured to the member. An eccentric device including a cam cooperates with a lost motion coupling for the second block to permit rapid initial installation of the guide followed by an increase in the clamping force to secure the guide in place. An elongated rib on the guide served to stabilize the saw as the cut is made and the saw base slides along a planar portion of the guide member protecting the object from damage during the sawing operation.

Young, U.S. Pat. No. 4,494,434, discloses a quick and accurate gauging means for locating and clamping a guide onto the top surface and leading edge of a workpiece, with respect to the line of cut desired. During execution of the cut, the gauging member of the guide is automatically returned to its storage position and cocked for the next cut.

The prior art teaches various saw guides that can be adjusted to cut precisely along the saw guide lower cut indicating edge. However, the prior art saw guides all require several time consuming steps to provide such customization. Since every hand operated power saw is somewhat different, having to repeatedly change the saw guide to match different power saws can waste a great deal of time. The prior art does not teach a saw guide that provides such accuracy, customized to the specific hand operated power saw, without time consuming adjustment.

The present invention provides a saw guide that is lightweight, inexpensive, and easy to use. The present invention lacks the number of parts and assembly required by the prior art, providing a simple, integral construction. In its preferred embodiment, the saw guide is designed to custom fit two different power saws without further alteration or customization. The present invention fulfills the long-felt need of the industry for a simpler saw guide and provides further related advantages as described in the following summary.

SUMMARY OF THE INVENTION

The present invention teaches certain benefits in construction and use which give rise to the objectives described below.

The present invention provides a method for precisely cutting a workpiece using a saw guide to guide a hand held power saw. The saw guide provides a first upper sliding surface and an opposing flat lower surface connected by a first side surface, the first upper sliding surface being bounded on one side by an integral guide ridge, and bounded on the opposing side by a first side surface. The method provides for first customizing the saw guide to a power saw having a base plate with a side edge. The saw guide is customized by positioning the power saw with the base plate resting upon the first upper sliding surface and the side edge contacting the integral guide ridge, and sliding the power saw along the saw guide, thereby cutting off the first side surface and creating a side cutting surface having a lower cut indicating edge. Once customized, the saw guide can be used with the power saw to cut the workpiece, with the lower cut indicating edge indicating to the user precisely where the power saw will cut the workpiece.

A primary objective of the present invention is to provide a method of using a power saw in conjunction with a saw guide to precisely cut a workpiece, the method having advantages not taught by the prior art.

Another objective is to provide a saw guide that can quickly and easily be customized to the power saw.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 3:
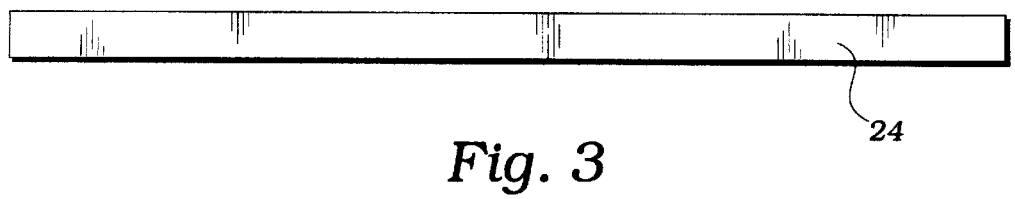
FIG. 3 is a bottom plan view thereof.
Figure 4:
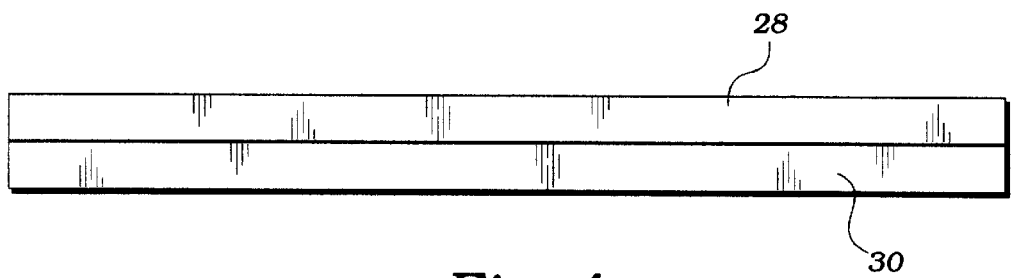
FIG. 4 is a front elevational view thereof.

The above described drawing figures illustrate an embodiment of the invention, a saw guide 20 for a hand held power saw 12 used to cut a workpiece 10. A saw guide 20 constructed in accordance with the invention is generally indicated by the reference numeral 20 in FIG. 1. The saw guide 20 provides a first upper sliding surface 22 and an opposing flat lower surface 24, the first upper sliding surface 22 being bounded on one side by an integral guide ridge 26 running the length of the saw guide 20, and bounded on the opposing side by a first side surface 30. The saw guide 20 has an integral construction, preferably forming an elongate, generally rectangular shape. The saw guide 20 is made of a light, inexpensive, rigid, inelastic material such as plastic that is easily cut with the power saw 12; and it is most preferably made of styrene. The saw guide 20 is thick enough to maintain its rigidity but thin enough to be easily cut and easily used as a guide for the power saw 12; it is most preferably 0.25 inches thick. This unique construction provides a saw guide 20 that is lightweight, inexpensive, and easy to use, lacking the number of parts and assembly required by the prior art. In its preferred embodiment, as described below, the saw guide 20 is designed to custom fit two different power saws 12 without further alteration or customization. Furthermore, the saw guide 20 is customizable to a specific power saw 12 by trimming the saw guide 20, as shown in FIG. 3 and as described below. Once customized, the saw guide 20 is used with a standard power saw 12 to cut a workpiece 10, as shown in FIG. 4. The customized saw guide 20 allows the user to make straight cuts precisely along a specific cutting line.

Figures 1, 2:
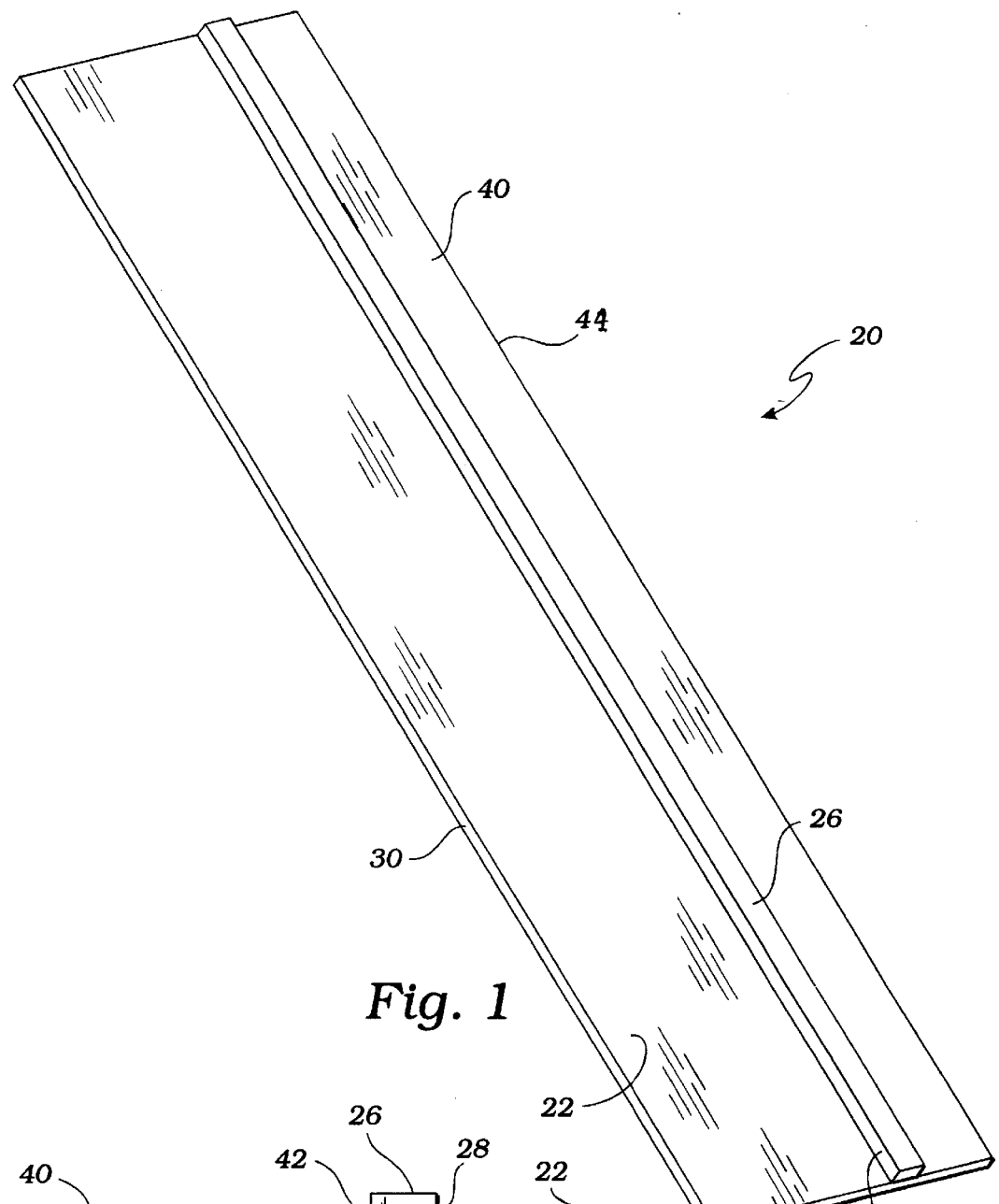
FIG. 1 is a perspective view of the preferred embodiment of the present invention.
FIG. 2 is a side elevational view thereof.
Figure 6:
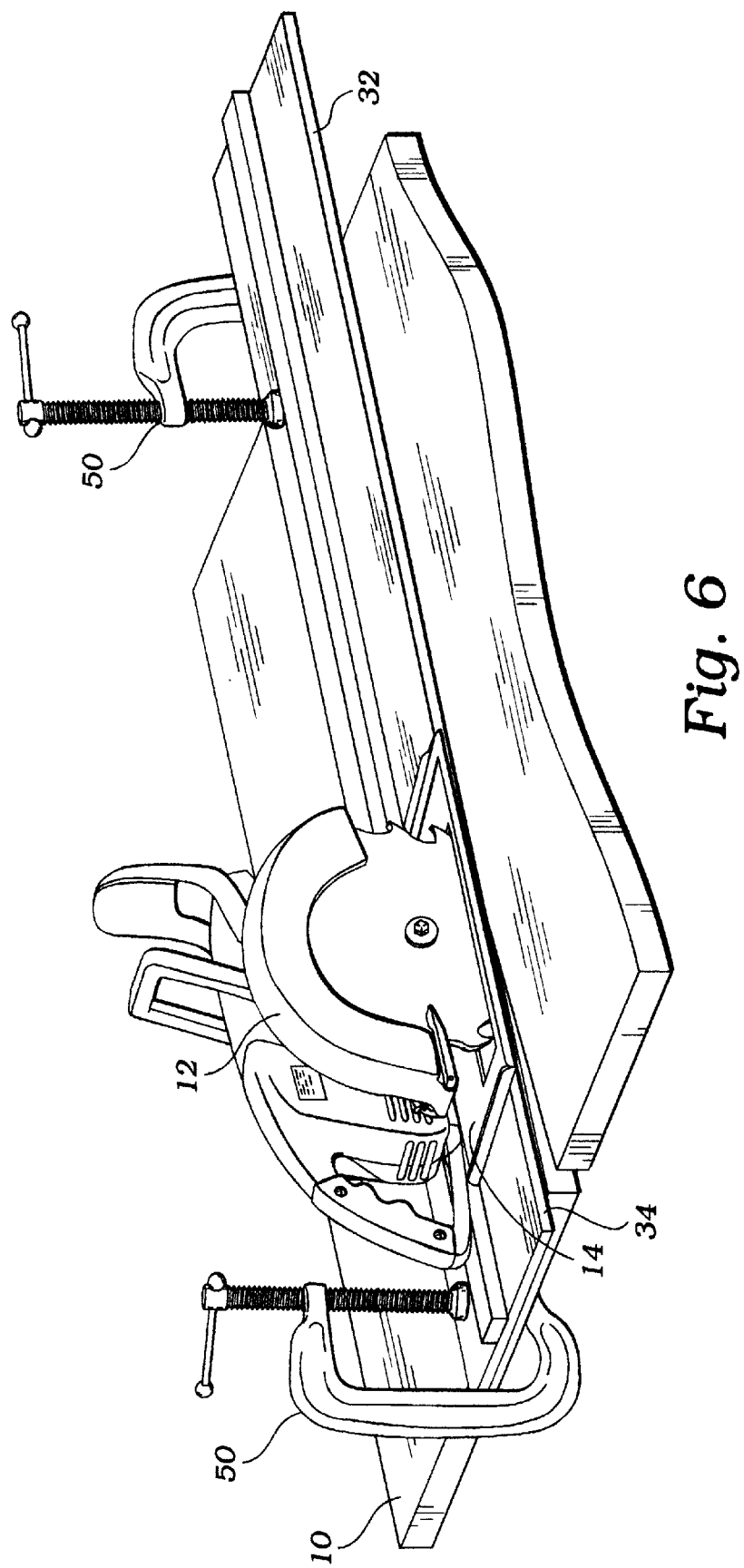
FIG. 6 is a perspective view showing a customized saw guide being used to cut a workpiece with a power saw, the lower cut indicating edge of the saw guide being customized to show precisely where that particular power saw will cut the workpiece.

As shown in FIGS. 1, 2 and 6, the first upper sliding surface 22 supports the base plate 14 of the power saw 12 as the base plate 14 of the power saw 12 slides along the first upper sliding surface 22 in the course of making a cut on the workpiece 10. The first upper sliding surface 22 is wide enough to accommodate the base plate 14 of the power saw 12 and runs the length of the saw guide 20. The first upper sliding surface 22 is preferably approximately 5.75 inches wide and long enough to allow the user to completely cut his workpiece 10 in one action without having to move or adjust the saw guide 20. This length, preferably approximately, 48 inches, will vary depending upon the workpiece 10 for which the saw guide 20 is designed. Opposite the first upper sliding surface 22 is the flat lower surface 24 shown in FIG. 3. The flat lower surface 24 is engagable directly with and supported on the workpiece 10. The flat lower surface 24 preferably is 8 inches wide and 48 inches long.

The integral guide ridge 26 extends from and runs parallel to the side of the first upper sliding surface 22. Opposite the integral guide ridge 26 is the first side surface 30. The integral guide ridge 26 has the first guide edge 28 facing the first side surface 30. It is critical that the integral guide ridge 26 is integral to the first upper sliding surface 22. This simple, integral construction is what makes customization of the saw guide 20 so fast and easy. The integral guide ridge 26 has a first guide edge 28 facing a first side surface 30. The integral guide ridge 26 preferably is 0.5 inches wide and extends 0.25 inches from the surface of the first upper sliding surface 22. The first guide edge 28 engages the related side edge 16 of the base plate 14 of the power saw 12 to guide the power saw 12 as the base plate 14 slides along the first upper sliding surface 22 in the course of making a cut on the workpiece 10.

Figure 5:
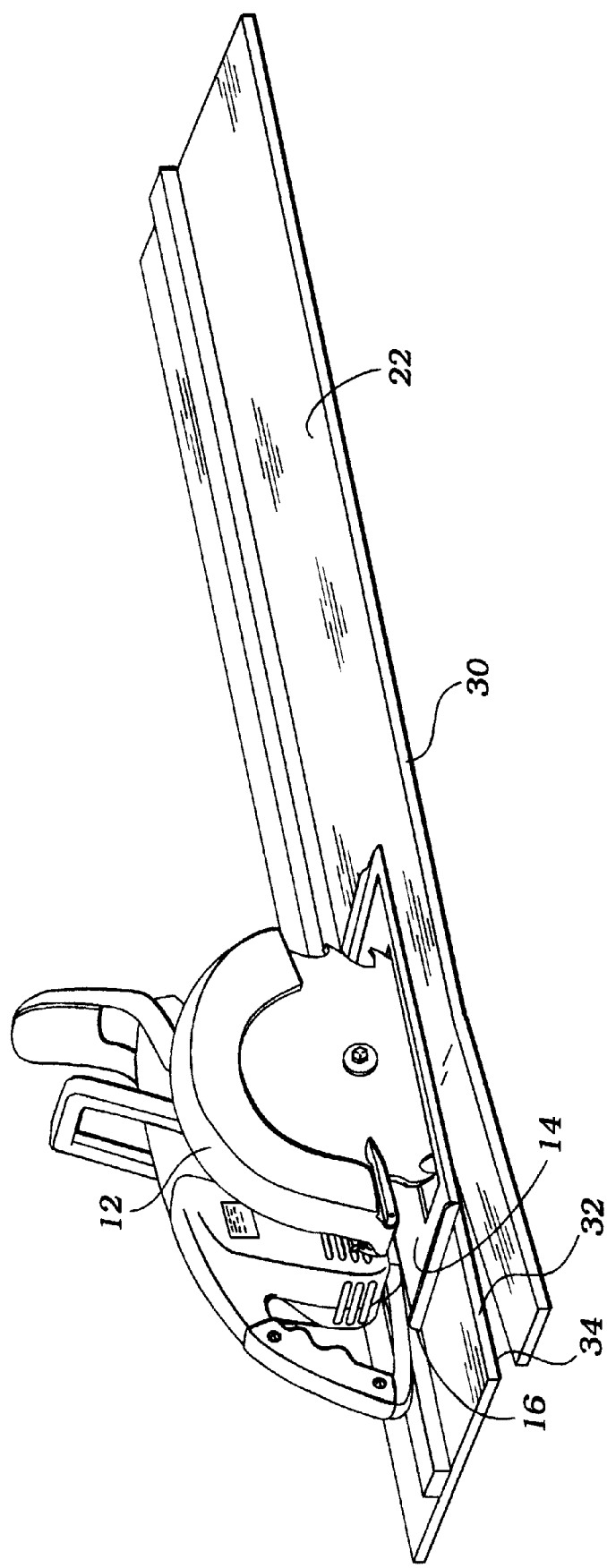
FIG. 5 is a perspective view of the invention showing a hand operated power saw cutting off a first side surface to customize the saw guide, leaving a side cutting surface having a lower cut indicating edge.

The first side surface 30 is clearly shown in FIGS. 1, 2, 4, and 5. The first side surface 30 is formed at the termination of the first upper sliding surface 22 of the saw guide 20, opposite the integral guide ridge 26. As shown in FIG. 5, the saw guide 20 is designed to be customized by first cutting off the first side surface 30 with the desired power saw 12. By cutting the saw guide 20 itself, the user can create the side cutting surface 32 having the lower cut indicating edge 34 that exactly matches the cutting line of an individual power saw 12. Once the power saw 30 has been trimmed, the saw guide 20 is ready for use, as described below.

In its most preferred embodiment, as shown in the above-described drawings, the saw guide 20 further includes a second upper sliding surface 40. The integral guide ridge 26 preferably has a second guide edge 42 opposite the first guide edge 28, and the second guide edge 42 faces the second upper sliding surface 40 terminating in a second side surface 44, approximately mirroring the first upper sliding surface 22 and first side surface 30. The second upper sliding surface 40 extends away from the integral guide ridge 26 adjacent the second guide edge 42 and opposite the first upper sliding surface 22. The second side surface 44 is thereby preferably located opposite the first side surface 30. While the first upper sliding surface 22 is preferably approximately 5.75 inches wide terminating in the first side surface 30, the second upper sliding surface 40 is preferably approximately 1.75 inches wide terminating in the second side surface 44. These widths are compatible with the guide widths of the largest power saws in general use. It is taken as understood, without repetitive elaboration, that the second upper sliding surface 40 is customized in the same manner, with the same results, as the first upper sliding surface 22. By providing both the first and second upper sliding surface 22 and 40, this saw guide 20 allows the user to customize his saw guide 20 to fit base plates of two different sizes.

This invention also includes a method for precisely cutting a workpiece 10 with the improved saw guide 20 described above. The method includes several steps. The use must first provide a saw guide 20, preferably as described above, having a first upper sliding surface 22, a flat lower surface 24, a first side surface 30, and an integral guide ridge 26 having a first guide edge 28. The user then provides a hand held power saw 12 having a base plate 14 with a related side edge 16. The saw guide 20 is useful with almost any hand held power tools such as circular saws, routers, and reciprocating saws, but it is preferably used with a hand held power saw 12. As shown in FIG. 5, the base plate 14 of the power saw 12 is then positioned on the first upper sliding surface 22 with the side edge 16 of the base plate 14 against the first guide edge 28; and the user can then cut off the first side surface 30 with the power saw 12 by sliding the power saw 12 down the length of the first upper sliding surface 22, creating the side cutting surface 32 having a lower cut indicating edge 34, the side cutting surface 32 being customized to the true cutting line of the power saw 12.

As shown in FIG. 6, once the saw guide 20 has been customized, it is ready for use in cutting a workpiece 10. The saw guide 20 is placed on the workpiece 10 and the lower cut indicating edge 34 is aligned along the line the user intends to cut into the workpiece 10. The saw guide 20 is preferably clamped to the workpiece 10 with a clamping means 50, preferably a pair of clamps well known in the art. The base plate 14 of the power saw 12 is then positioned on the first upper sliding surface 22 with the side edge 16 of the base plate 14 against the first guide edge 28. The workpiece 10 is then cut with the power saw 12 by sliding the power saw 12 down the length of the first upper sliding surface 22, maintaining the side edge 16 of the base plate 14 against the first guide edge 28 of the integral guide ridge 26. This process can be repeated with a different power saw 12 using the second upper sliding surface 40, thereby allowing the user to customize the single saw guide 20 to a second power saw 12, also achieving accurate cuts along the desired cut line.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for precisely cutting a workpiece, the method comprising the steps of:

a) providing a saw guide comprising:
   a first upper sliding surface;
   an opposing lower surface;
   a first side surface connecting the first upper sliding surface and the opposing flat lower surface; and
   an integral guide ridge having a first guide edge, the integral guide ridge being positioned opposite the first side surface and functioning to defining the first upper sliding surface;

b) providing a hand held power saw having a base plate with a side edge;

c) positioning the base plate of the power saw on the first upper sliding surface with the side edge of the base plate positioned against the first guide edge;

d) sliding the power saw along the first upper sliding surface while maintaining contact between the side edge and the first guide edge, thereby cutting off the first side surface and creating a side cutting surface having a lower cut indicating edge;

e) placing the saw guide on the workpiece;

f) aligning the lower cut indicating edge where the workpiece is to be cut;

g) positioning the base plate of the power saw on the first upper sliding surface with the side edge of the base plate against the first guide edge; and h) cutting the workpiece with the power saw by sliding the power saw along the first upper sliding surface while maintaining contact between the side edge and the first guide edge.

\* \* \* \* \*